United States Patent [19]

Thorson et al.

[11] Patent Number: 5,701,416
[45] Date of Patent: Dec. 23, 1997

[54] ADAPTIVE ROUTING MECHANISM FOR TORUS INTERCONNECTION NETWORK

[75] Inventors: Gregory M. Thorson, Altoona; Steven L. Scott, Eau Claire, both of Wis.

[73] Assignee: Cray Research, Inc., Eagan, Minn.

[21] Appl. No.: 421,566

[22] Filed: Apr. 13, 1995

[51] Int. Cl.$^6$ .................................................. G06F 15/16
[52] U.S. Cl. ........................ 395/200.15; 395/200.01; 340/825.02; 340/825.03; 340/826; 340/827
[58] Field of Search .................. 395/200.15, 200.01; 340/825.02, 825.03, 826, 827

[56] References Cited

U.S. PATENT DOCUMENTS

| Re. 28,577 | 10/1975 | Schmidt | 179/15 |
|---|---|---|---|
| 4,771,391 | 9/1988 | Blasbalg | 364/514 |
| 4,868,818 | 9/1989 | Madan et al. | 371/11 |
| 4,933,933 | 6/1990 | Dally et al. | 370/60 |
| 5,008,882 | 4/1991 | Peterson et al. | 370/94.3 |
| 5,031,211 | 7/1991 | Nagai et al. | 379/221 |
| 5,105,424 | 4/1992 | Flaig et al. | 370/94.1 |
| 5,157,692 | 10/1992 | Horie et al. | 375/38 |
| 5,170,482 | 12/1992 | Shu et al. | 395/800 |
| 5,175,733 | 12/1992 | Nugent | 370/94.3 |
| 5,218,601 | 6/1993 | Chujo et al. | 370/16 |
| 5,218,676 | 6/1993 | Ben-Ayed et al. | 395/200 |
| 5,239,545 | 8/1993 | Buchholz | 370/95.3 |
| 5,280,474 | 1/1994 | Nickolls et al. | 370/60 |
| 5,313,628 | 5/1994 | Mendelsohn et al. | 395/575 |
| 5,313,645 | 5/1994 | Rolfe | 395/800 |
| 5,331,631 | 7/1994 | Teraslinna | 370/60 |
| 5,333,279 | 7/1994 | Dunning | 395/325 |
| 5,341,504 | 8/1994 | Mori et al. | 395/800 |
| 5,347,450 | 9/1994 | Nugent | 395/200 |
| 5,353,283 | 10/1994 | Tsuchiya | 370/60 |
| 5,440,547 | 8/1995 | Easki et al. | 370/60 |
| 5,517,497 | 5/1996 | LeBoudec et al. | 370/60.1 |
| 5,546,549 | 8/1996 | Barrett et al. | 395/309 |
| 5,548,639 | 8/1996 | Ogura et al. | 379/221 |
| 5,550,589 | 8/1996 | Shiojiri et al. | 348/387 |
| 5,555,542 | 9/1996 | Ogura et al. | 370/94.1 |

FOREIGN PATENT DOCUMENTS

| 0501524 | 9/1992 | European Pat. Off. . |
|---|---|---|
| 0570729 | 4/1993 | European Pat. Off. . |
| WO88/08652 | 11/1988 | WIPO . |

OTHER PUBLICATIONS

R. Bolla, F., et al., "A Neural Strategy for Optimal Multiplexing of Circuit and Packet-Switched Traffic," Department of Communications, Computer and Systems Science (DIST), University of Genoa, pp. 1324–1330, 1992.

Y. Boura et al., "Efficient Fully Adaptive Wormhole Routing in n-dimensional Meshes", *IEEE*, pp. 589–596. (1994).

L. Gravano et al., "Adaptive Deadlock-and Livelock-Free Routing with all Minimal Paths in Torus Networks", *IEEE Transactions on Parallel and Distributed Systems*, 5, pp. 1233–1251, (Dec. 1994).

(List continued on next page.)

*Primary Examiner*—Jack B. Harvey
*Assistant Examiner*—Jigar Pancholi
*Attorney, Agent, or Firm*—Schwegman, Lundberg, Woessner & Kluth, P.A.

[57] ABSTRACT

A routing mechanism includes two acyclic non-adaptive virtual channels having two types of virtual channel buffers to store packets along deterministic virtual paths between nodes in an n-dimensional networked system, and an adaptive virtual channel having a third type of virtual channel buffer to store the packets along non-deterministic virtual paths between the nodes. The packets are routed between the nodes along either selected portions of the deterministic virtual paths or selected portions of the non-deterministic virtual paths based on routing information such that a packet is never routed on a selected portion of one of the non-deterministic virtual paths unless the third type virtual channel buffer associated with the selected portion of the one non-deterministic virtual path has sufficient space available to store the entire packet.

22 Claims, 6 Drawing Sheets

OTHER PUBLICATIONS

Z. Liu et al., "Grouping Virtual Channels for Deadlock–Free Adaptive Wormhole Routing", *Parle '93 Parallel Architectures and Languages Europe, 5th International Parle Conference, Munich, Germany*, pp. 255–265, (Jun. 14–17, 1993).

M. Shumway, "Deadlock–Free Packet Networks", *Transputer Research and Applications 2, NATUG–2 Proceedings of the Second Conference of the North American Transputer Users Group*, pp. 140–177, (Oct. 18–19, 1989).

"Deadlock–Free Routing Schemes on Multistage Interconnection Networks", *IBM Technical Disclosure Bulletin*, 35, 232–233 (Dec. 1992).

Robert Gallager, "Scale Factors for Distributed Routing Algorithms", *NTC '77 Conference Record*, 2 (1978).

Peter Nuth et al., "The J–Machine Network", *IEEE* 420–423 (1992).

C.S. Yang "Performance Evaluation of Multicast Wormhole Routing in 2D–Torus Multicomputers", *IEEE*, 173–178 (1992).

J. Yantchev et al., "Adaptive, low latency, deadlock–free packet routing for networks of processors", *IEE Proceedings*, 136, 178–186 (May 1989).

William Dally et al, "Deadlock–Free Message Routing in Multiprocessor Interconnection Networks", *IEEE Transactions on Computers*, C–36, 547–553 (May 1987).

William Dally, "Performance Analysis of k–ary n–cube Interconnection Networks", *IEEE Transactions on Computers*, 39, 775–785 (Jun. 1990).

William Dally, "Virtual–Channel Flow Control", *IEEE*, 60–68 (1990).

C.R. Jesshope, P.R. Miller and J.P. Yantchev, *High Performance Communications in Processor Networks*, proc. 16th International Symposium on Computer ARchitecture at 150–157, May 1989.

D.H. Linder and J.C. Harden, *An Adaptive and Fault Tolerant Wormhole Routing Strategy for k–ary n–cubes*, I.E.E.E. Trans. on Computers, at Feb. 12, Jan. 1991.

W.J. Dally and H. Aoki, *Deadlock–Free Adaptive Routing in Multicomputer Networks Using Virtual Channels*, I.E.E.E. Transactions on Parallel and Distributed Systems, vol. 4, No. 4, at 466–475, Apr. 1993.

C.J. Glass and L.M. Ni, *The Turn Model for Adaptive Routing*, Proc. 19th International Symposium on Computer architecture, at 278–287, May 1992.

A.A. Chien and J.H. Kim, *Planar–Adaptive Routing: Low Cost Adaptive Networks for Multiprocessors*, proc. 19th International. Symposium on Computer Architecture at 268–277, May 1992.

J. Duato, *A New Theory of Deadlock–Free Adaptive Routing in Wormhole Networks*, I.E.E.E. Transactions on Parallel and Distributed Systems, vol. 4, No. 12, at 1320–1331, Dec. 1993.

Adve, V.S. and M.K. Vernon, "Performance Analysis of Mesh Interconnection Networks with Deterministic Routing," Transactions on Parallel and Distributed Systems, pp. 225–246, Mar. 1994.

D. Talia; "Message–Routing Systems for Transputer–Based Multicomputers"; *IEEE Micro;* No. 3, pp. 62–72; (Jun. 13, 1993).

→ CONTROL
↔ DATA
+X
←→ COMMUNICATION LINK

ADAPTIVE ROUTING MECHANISM FOR TORUS INTERCONNECTION NETWORK

FIELD OF THE INVENTION

The present invention relates generally to the field of high-speed digital data processing systems, and more particularly, to a method of adaptive routing of data within a multiprocessing network which avoids deadlock.

BACKGROUND OF THE INVENTION

Multiprocessor computer systems comprise a number of processing element nodes connected together by an interconnect network. The overall performance of the multiprocessor system depends to a large extent upon the interconnect network performance.

The primary cause of interconnect network performance degradation is congestion due to non-uniform communication patterns and random equations in the network. Even when congestion is limited to a very localized set of processing element nodes, the congestion can lead to a significant backup of messages. One technique that has been used to deal with the congestion problems is adaptive routing. Adaptive routing allows packets of data to be dynamically routed around congested areas in the network. Nevertheless, the potential performance advantages of adaptive routing mechanisms add design complexity and introduce the possibility of deadlock if not implemented properly. Furthermore, in a 3-D torus interconnect topology, previous solutions to avoid deadlock have been excessively expensive.

The interconnect network transmits packets of information between nodes. Examples of information possibly contained in a packet are messages, a shared-memory operation, or various forms of data. Packets comprise multiple physical transfer units (phits). A phit is typically the width of a network physical communication link or physical channel between processing element nodes.

Network performance is a function of packet latency and throughput. Packet latency is the time from initiating a packet send until the last phit of the packet is received at its target. The packet throughput is typically measured as the bytes per second per processing element delivered by the interconnect network. Latency and throughput are interdependent and are both dependent upon the communication workload.

Types of Interconnect Networks

First generation multiprocessor systems utilize store-and-forward interconnect networks. Store-and-forward interconnect networks transfer packets as single units from node to node along the path from source to destination. Each node waits to pass the head of a packet onto the next node until the last phit of the packet has been received.

More recent multiprocessor systems utilize interconnect networks using some form of wormhole routing. Wormhole routing interconnect networks route the head of the packet from a node before the tail of the packet is received by that node. The packet is divided into a number of smaller message packets called flow control units (flits), which may be one or more phits. A header flit contains routing information. The header flit is received by a processing element node and examined as to its destination. The header flit is sent on to the next node indicated by the routing algorithm. The remaining flits follow behind the header flit in a train-like fashion. Flow control between nodes is accomplished on a flit-by-flit basis, rather than a packet-by-packet basis as in the store-and-forward interconnect networks. Thus, in wormhole routing, a packet may be partially transmitted across a physical communication link, and then blocked due to a shortage of buffer space in the receiving node.

Worm hole routing significantly reduces packet latency in lightly loaded networks, because the time to transmit the packet onto a link (phits per packet times clock period) is suffered only once per network transversal, rather than once per hop. Wormhole routing also significantly reduces network buffering requirements, as a node is not required to buffer an entire packet.

A problem with wormhole routing, however, is that when a header flit blocks, the remaining flits stall behind the header. These remaining flits may possibly be across multiple links and nodes in the network. A blocked packet may prevent other packets from proceeding, even those that do not want to route through the node at which the header flit is blocked. This can cause significant network degradation, especially in the presence of non-uniform communication patterns.

A third type of interconnect network is a virtual cut-through network. A virtual cut-through interconnect network is similar to wormhole routing networks, except that when a packet blocks a buffer, that buffer must always accept the entire packet. Thus, virtual cut-through routing avoids the problems inherent in the blocking occurring in wormhole routing, but at the cost of additional hardware necessary to buffer all of the blocked packets.

The present application is related to mechanisms for enhancing wormhole routing networks.

Deadlock

Deadlock occurs when cyclic dependencies arise among a set of channel buffers, causing all involved buffers to fill up and block. A primary consideration in the design of interconnect networks and corresponding routing algorithms is avoiding deadlock.

Deadlock situations can be formalized via a channel dependency graph, a directed graph whose nodes represent network channels and whose arcs represent dependencies between channels. An arc exists between channels x and y iff a packet can route directly from channel x to channel y. It can be proven that a network is deadlock free if its channel dependency graph is acyclic.

One simple method to avoid deadlock is to restrict the topology of the interconnect network and/or the routing function used to route packets between the processing element nodes on the interconnect network to remove the possibility of cyclic buffer dependencies. For example, a binary hypercube topology is deadlock-free if the routing function is restricted so that the dimensions are always traversed in increasing order using the e-cube or dimension order routing algorithm. Since at most one hop is made per dimension and no packets route to a lower dimension, there can be no cyclic buffer dependencies. The e-cube routing algorithm can also be used to make an n-dimensional mesh topology deadlock-free, since the opposite-flowing traffic in each dimension uses distinct sets of buffers and the dimensions are traversed in increasing order. The torus topology, however, is not deadlock free when restricted to e-cube routing, because the wrap-around links in the torus topology allow cyclic buffer dependencies to form on a single ring.

In addition, even in meshes, deadlock can arise due to dependencies between request and response packets. Since a node may not be able to accept more request packets until that node has transmitted response packets for previous requests, deadlock can occur if response packets are made to wait behind request packets in the network. An expensive solution to this dependency problem between request and response packets is to use separate physical networks for requests and responses.

Virtual Channels

Virtual channels have been used to avoid deadlock and to reduce network congestion. Each physical channel is broken up into one or more virtual channels. Each virtual channel includes virtual channel buffers to store packets along a virtual path. The virtual channels are multiplexed across common physical channels, but otherwise operate independently. Thus, a blocked packet on a first virtual channel multiplexed across the common physical channel does not block packets behind a second virtual channel multiplexed on the common physical channel.

Adaptive Routing

Adaptive routing has been used to increase multiprocessor computer system performance. Adaptive routing interconnect networks dynamically route packets around congestion in the network. Thus, adaptive routing mechanisms dramatically increase network throughput and lower the sensitivity of the network to variations in communication patterns.

Adaptive routing algorithms are characterized as being either minimal or non-minimal. Minimal routing algorithms allow only shortest-distance routing paths between a source node and a destination node. Non-minimal algorithms allow packets to route along alternate paths that increase the total routing distance between the source and destination nodes. Thus, non-minimal algorithms permit adaptive routing in situations where minimal algorithms are constrained to a single path. In this way, non-minimal routing is used to dynamically route around faults in a network. However, non-minimal routing causes network interference between processes in different physical partitions. In addition, non-minimal routing permits livelock situations to occur, because forward progress is not guaranteed. Deadlock avoidance becomes more complicated with non-minimal routing.

Minimal adaptive routing algorithms can be fully adaptive or partially adaptive. Fully adaptive routing allows any of the alternate paths between source and destination, while partially adaptive routing restricts the choices in some manner. For example, a partially adaptive algorithm might require that routing in the positive direction of all dimensions be completed before any routing in the negative direction takes place. In a 2D torus, this results in full adaptability for a packet moving in the +X and +Y directions, but results in deterministic routing for a packet moving in the +X and -Y directions.

Because deadlock must be avoided, adaptive routing algorithms are difficult to implement. As mentioned above, deadlock can be avoided by restricting the topology or routing function in order to remove cycles from the channel dependency graph. By contrast, the goal of adaptive routing is to increase the freedom of the routing function in order to provide a greater number of alternate paths over which a packet may route.

An additional problem introduced by adaptive routing relates to network ordering. With deterministic (non-adaptive) routing, two packets sent from the same source to the same destination will be delivered in order. In many situations, the packets must be delivered in a set order such as write requests to the same remote memory location. Adaptive routing in general allows the two packets to take different routes and arrive in the opposite order. Thus, the problem of delivering the packets in order must be addressed if order delivery is required.

Fully Adaptive Routing Using Virtual Channels

In C. R. Jesshope, P. R. Miller and J. P. Yantchev, *High Performance Communications in Processor Networks*, proc. 16th International Symposium on Computer Architecture, at 150–157, May 1989, a physical network is split into multiple virtual networks, depending upon the direction of travel, in order to break cycles caused by turns. Additional virtual channels within each virtual network are disclosed to break cycles caused by wrap-around links in a torus. $2^n$ virtual networks are required for an n-dimensional torus or mesh. Double the number of virtual channels are required to break the wrap-around cycles in a 2D torus topology. The Jesshope et at. document does not address cycles created by requests and the corresponding responses. The requests/response cycles double the number of virtual channels required to break all cycles. In order to construct a 3D mesh for request and response traffic using the Jesshope et al. scheme, 16 virtual channels per physical channel would be required. At least 32 virtual channels would be required per physical channel for a 3D torus topology.

In D. H. Linder and G. C. Harden, *An Adaptive and Fault Tolerant Wormhole Routing Strategy for k-ary n-cubes*, I.E.E.E. Trans. on Computers, at 2–12, Jan. 1991, virtual networks based upon the direction of travel are used for n-dimensional toms or mesh. Linder et at. requires $2^n-1$ virtual networks for an n-dimensional torus or mesh. In addition, n+1 virtual channels per virtual network are required to break cycles caused by wrap-around links in a torus. Again, requests/response cycles are not addressed in the Linder et al. reference. A 3D torus topology using the Linder et al. scheme would require 32 virtual channels per physical channel.

In W. J. Dally and H. Aoki, *Adaptive Routing Using Virtual Channels*, I.E.E.E. Transactions on Parallel and Distributed Systems, Vol. 4, No. 4, at 466–475, April 1993, both a static algorithm and a dynamic routing algorithm are presented. In the Dally et at. static algorithm, rather than creating classes of virtual channels based upon the directions of travel, classes of virtual channels are created based upon the number of dimension reversals a packet has made. A dimension reversal occurs when a packet routes from a higher numbered dimension to a lower numbered dimension. With n+1 such classes, a packet may only make n dimension reversals and then must route deterministically. The Dally et al. reference only discusses meshes. The Dally et at. dynamic scheme is discussed below under the deadlock-free subnetwork section.

Partially Adaptive Routing Using Virtual Channels

The above references describe fully adaptive routing mechanisms based on additional virtual channels. In C. J. Glass and L. M. Ni, *The Turn Model for Adaptive Routing*, Proc. 19th International Symposium on Computer Architecture, at 278–287, May 1992, a turn model routing method is described which provides partial adaptivity without adding virtual channels. The turn model restricts the turns that packets can make in order to break cycles in the channel dependency graph. Glass et al. presents several partially adaptive routing algorithms for 2D mesh topologies. For example, a west-first algorithm is described which routes packets deterministically west, and then adaptively in the east, north, and south directions. For minimal routing, the west-first routing algorithm provides full adaptivity for packets that do not travel west and no adaptivity for those that travel west. The Glass et al. reference states that it is impossible to provide adaptive, deadlock-free, minimal routing algorithms for tori with radix greater than four without adding extra virtual channels. Some non-minimal partially adaptive algorithms for tori topologies are presented in the Glass et al. reference.

In A. A. Chien and J. H. Kim, *Planar-Adaptive Routing: Low-Cost Adaptive Networks for Multiprocessors*, proc. 19th International Symposium on Computer Architecture, at 268–277, May 1992, a planar adaptive model is described. The planar adaptive model provides partial adaptability for tori and meshes by using additional virtual channels. The planar adaptive model routes packets adaptively in a series of 2D planes (e.g., XY and YZ in a 3D network). The planar adaptive model requires a constant number of virtual channels for n-dimensional networks, independent of n, for n greater than two. The planar adaptive model requires three virtual channels per physical channel for a mesh topology and six virtual channels per physical channel for a torus topology. The Chien et at. reference, however, neglects to take account of request/response cycles. A 3D torus network using the planar adaptive model would require 12 virtual channels per physical channel to break the request/response cycles.

Deadlock-Free Subnetwork

As mentioned above, it had been previously believed that in order to avoid deadlock in an interconnect network, the channel dependency graph must be acyclic. The following two routing schemes are based on the idea that the channel dependency graph does not have to be acyclic, so long as there is an acyclic portion of the graph which packets can always enter and which allows the packets to reach their destination.

The first such scheme is the Dally et al. dynamic routing algorithm referred to above and described in the Dally et al. reference. Like the Dally et al. static algorithm, the Daily et al. dynamic algorithm counts the number of dimension reversals a packet takes, but does not limit this number other than by the size of the field and the packet that is used to record the number. The network is broken up into only two classes: adaptive and non-adaptive. All packets start in the adaptive virtual network, and may run into lower dimensions as often as desired. Any packet that would have to wait on a buffer held by a packet with a lower dimension-reversal number, must leave the adaptive virtual network and route the remainder of the way to its destination in the non-adaptive virtual network. This dynamically prevents deadlock cycles from occurring in the adaptive virtual network.

The Dally et at. dynamic routing algorithm provides fully adaptive routing with only a single extra virtual channel per physical channel. However, when a packet must leave the adaptive virtual network to route in the non-adaptive virtual network, the packet must remain in the non-adaptive virtual network for the duration of its travel. Therefore, as soon as a packet drops into the non-adaptive virtual network, adaptability is lost. The Dally et at. dynamic scheme is fairly complex to implement, because the dimension-reversal numbers must be maintained for all packets, and nodes must know the dimension-reversal numbers of packets stored in the channel buffers for all adaptive channels on which the nodes can transmit.

The second adaptive routing scheme using the underlying idea that the channel dependency graph does not have to be acyclic is disclosed in J. Duato, *A New Theory of Deadlock-Free Adaptive Routing in Wormhole Networks*, I.E.E.E. Transactions on Parallel and Distributed Systems, Vol. 4, No. 12, at 1320–1331, December 1993. The Duato adaptive routing scheme splits the set of virtual channels (C) into two subsets (C1, NC1). The first subset (C1) implements non-adaptive, deadlock-free routing among all nodes. The second subset (NC1) implements minimal adaptive routing and may possibly have cycles in its channel dependency graph. Packets can route freely in the NC1 channels, and circular dependencies may arise among the NC1 buffers. Packets in NC1 must always be able to route into a C1 channel in order to break these cyclic dependencies. Packets in C1 may route to an NC1 channel at any time.

In order to prevent deadlock from occurring, Duato imposes several restrictions in his adaptive routing scheme. First, Duato defines the routing as a function of the current node and the destination node, rather than the more flexible function of the current channel and the destination node. Most routing algorithms define the routing function as a function of the current channel and the destination node. Duato's second restriction is that virtual channel queues (buffers) cannot contain flits belonging to different packets. To implement this requirement, Duato requires that after a queue accepts a tail flit, the queue must be emptied before accepting another header flit. This restriction guarantees that all packets in NC1 will be able to route into C1 if needed to break a cyclic dependency. In the Duato scheme, it is not permitted possible for a head of a packet to be blocked behind another packet in its NC1 queue, so the head is always accessible (at the front of the queue).

The third restriction of the Duato scheme is that the extended channel dependency graph of the C1 virtual network must be acyclic. The extended channel dependency graph is the regular channel dependency graph augmented with additional arcs for indirect dependencies. An indirect dependency exists between C1 channels x and y, iff a packet can route from channel x to an NC1 channel, route zero or more additional hops in the NC1 channel, and then route to C1 on channel y. The extended channel dependency graph for the C1 subnetwork of a torus is cyclic. Thus, the Duato scheme does not work for torus topologies.

None of the above approaches to adaptive routing are suitable mechanisms for 3-D torus networks. Thus, a fully adaptive routing mechanism is desired which provides deadlock free routing on a torus of any dimension and requires minimal virtual channels for implementation.

SUMMARY OF THE INVENTION

The present invention provides a method and apparatus for routing a packet between a source node and a destination node in a networked system having a plurality of nodes and physical communication links interconnecting the nodes in an n-dimensional topology. A packet is formed by attaching a header having routing information to information to be transferred. Each physical communication link is assigned a first type virtual channel buffer, a second type virtual channel buffer, and a third type virtual channel buffer. Two acyclic non-adaptive virtual channels are defined to be capable of utilizing the first and the second type virtual channel buffers to store the packet along a deterministic virtual path from the source node to the destination node based on the routing information. An adaptive virtual channel is defined to be capable of utilizing the third type of virtual channel buffers to store the packet along a plurality of non-deterministic virtual paths from the source node to the destination node based on the routing information. The packet is routed along either a portion of the deterministic virtual path from the source node to an adjacent node or a portion of one of the non-deterministic virtual paths from the source node to an adjacent node based on the routing information such that the portion of the one non-deterministic virtual path is not selected for routing unless the third type virtual channel buffer associated with the portion of the one non-deterministic virtual path has sufficient space available to store the entire packet. The packet continues to route on virtual paths selected based on the routing information in the above manner until the packet reaches the destination node.

The preferred embodiment of the present invention defines a direction order for routing packets. The direction order defines a priority for routing the packets in each of 2n direction along the deterministic virtual path. The one non-deterministic virtual path is preferably pre-selected for routing in the lowest priority direction of the 2n directions that is not blocked or disabled.

In a preferred embodiment of the present invention a path is selected for routing by pre-selecting the one non-deterministic virtual path and by requesting both the portion of the pre-selected non-deterministic virtual path and the portion of the deterministic virtual path for routing of the packet. Access to the physical communication links is granted or denied in response to the requests and other competing requests for the physical communication links. If an adaptive virtual channel and a non-adaptive virtual channel are both requesting access of a physical communication link the non-adaptive virtual channel is granted access to the physical communication link. The portion of a granted virtual path is selected if at least one of the requests is granted. The portion of the one non-deterministic virtual path is selected if both of the requests are granted. The requests are retried if neither of the requests are granted.

The present invention preferably routes multiple packets between the plurality of nodes. In one form of the present invention to support ordered routing, order dependent groups of packets are determined which are required to arrive at the destination node in a pre-determined order. Only the deterministic virtual paths are selected for routing packets which are in an order dependent group of packets.

To account for the cycles created between request packets and response packets, the acyclic non-adaptive virtual channels preferably includes two acyclic non-adaptive virtual channels for handling the request information and two separate acyclic non-adaptive virtual channels for handling the response information.

A preferred embodiment of the present invention uses initial free hops and final hops to provide shorter alternate routes. The initial free hops and final hops permit the interconnect network to configure around many multiple failures that would otherwise be uncorrectable.

Another aspect of the present invention provides a routing mechanism for supporting arbitrary-length packets by allowing the portion of the one non-deterministic virtual path to be selected for routing even though the third type virtual channel buffer associated with the portion of the one non-deterministic virtual path does not have sufficient space available to store the entire packet. This routing mechanism, however, does not select the portion of the one non-deterministic virtual path for routing unless the third type virtual channel buffer associated with the portion of the one non-deterministic virtual path is empty. If a packet is routed to the portion of the one non-deterministic virtual path, a direction and a deterministic virtual path the packet is on as the packet enters the portion of the one non-deterministic virtual path are recorded. When the packet reenters the deterministic virtual path, the packet continues to route in the recorded direction on the recorded deterministic vital path if all transfers in the recorded direction are not completed.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

MPP System

Figure 1:
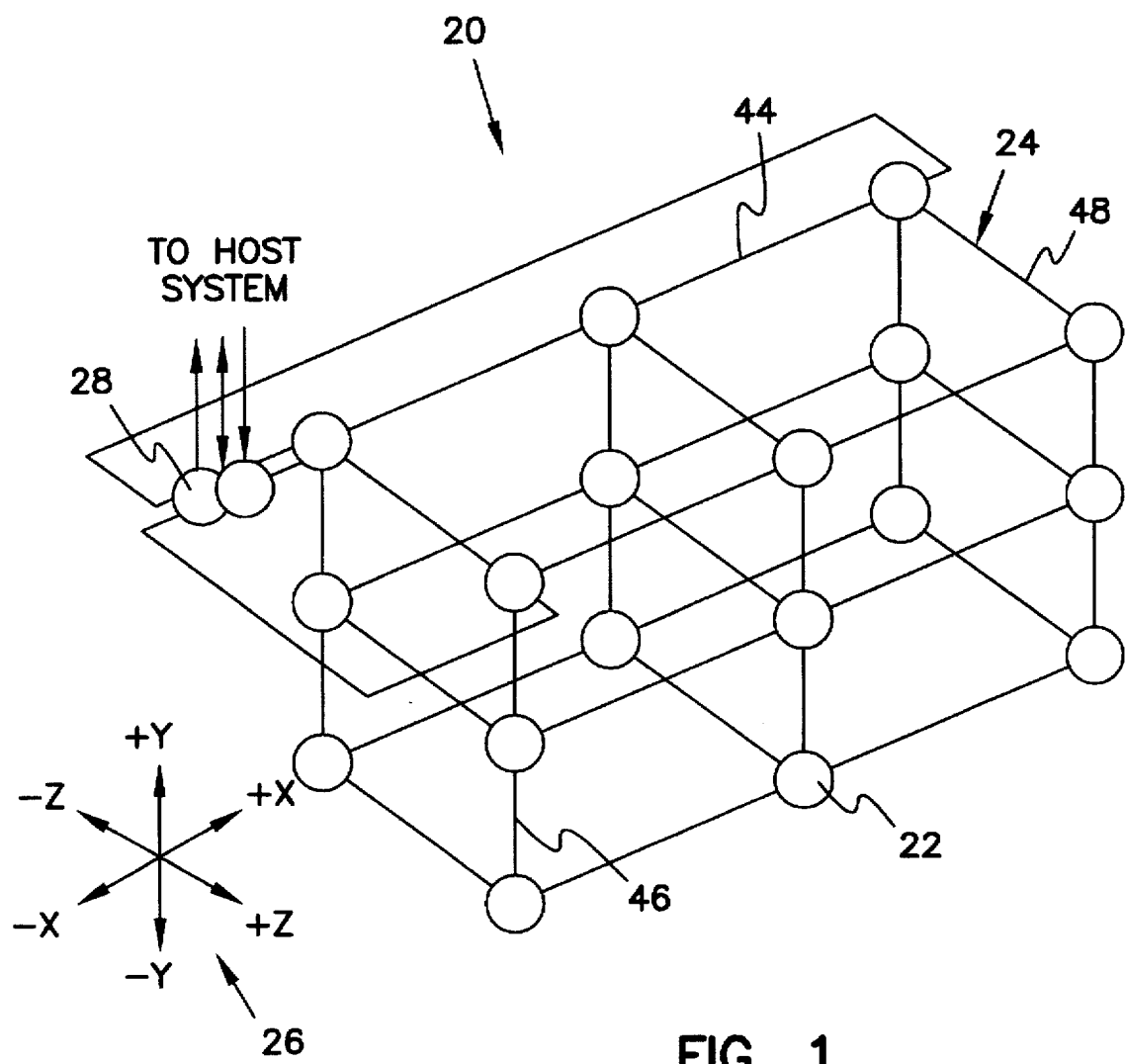
FIG. 1 is a diagram of a massively parallel processing (MPP) system.

FIG. 1 illustrates a simplified model of the components of a massively parallel processing (MPP) system generally indicated at 20. MPP system 20 typically comprises hundreds or thousands of processing element nodes, such as processing element node 22. An interconnect network 24 provides communication paths among the processing element nodes in MPP system 20. In the model of system 20 illustrated in FIG. 1, interconnect network 24 forms a three-dimensional matrix of paths which connect the processing element nodes in the x, y, and z dimensions as indicated by arrows 26. Interconnect network 24 also connects the processing element nodes to an I/O gateway 28. I/O gateway 28 transfers system data and control information between a host system (not shown) and MPP system 20.

The host system runs software compilers for MPP system 20. All software programs written for MPP system 20 are compiled on the host system, but are run in MPP system 20.

In a single-cabinet configuration, the host system resides in the same cabinet as MPP system 20. In a multiple-cabinet configuration, the host system resides in a separate cabinet that is cabled to MPP system 20.

Figure 2:
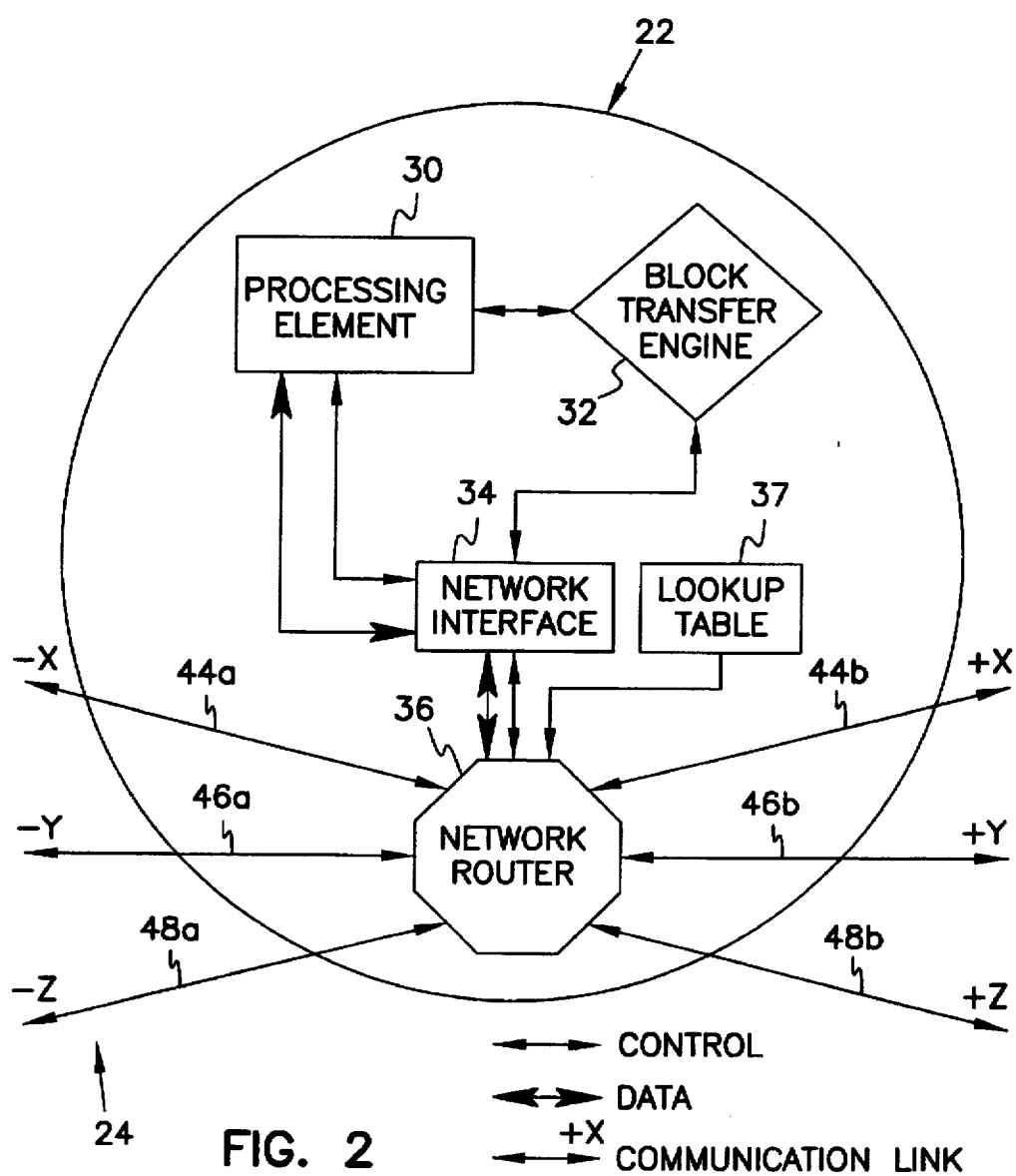
FIG. 2 is a diagram of a processing element node and interconnect network components for the MPP system of FIG. 1.

FIG. 2 provides a more detailed illustration of processing element node 22 and the connection of processing element 22 to interconnect network 24. Each processing element node, such as processing element node 22, typically comprises a processing element 30, a block transfer engine 32, and a network interface 34. Processing element node 22 may comprise more than one processing element 30.

Figure 3:
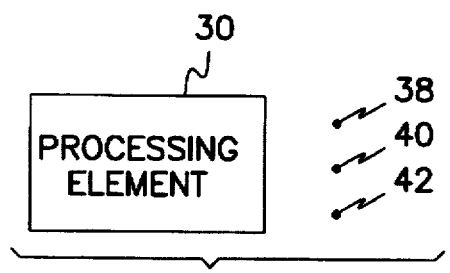
FIG. 3 is a diagram of processing element components for the MPP system of FIG. 1.

As illustrated in FIG. 3, each processing element 30 comprises a microprocessor 38, a local memory 40, and support circuitry 42.

MPP system 20 includes a physically distributed memory, became each processing element contains local memory. Nevertheless, the MPP system memory is also logically shared. System memory is logically shared because the microprocessor in one processing element can access a memory of another processing element without involving the microprocessor in that processing element.

Local memory 40 preferably comprises a dynamic random access memory (DRAM) to store system data. A low-latency, high-bandwidth data path connects the microprocessor to local memory in processing element 30.

Support circuitry 42 extends the control and addressing functions of microprocessor 38. Support circuitry 42 performs data transfers to or from local memory 40.

Referring back to FIG. 2, block transfer engine (BLT) 32 is an asynchronous direct memory access controller that redistributes system data. BLT 32 redistributes system data between local memory in processing element 30 and the local memory in remote processing elements. BLT 32 is capable of redistributing data without interrupting processing element 30 or the remote processing elements. In an alterative embodiment of MPP system 20, software controls movement of blocks of data between the local memories of the processing elements.

Network interface 34 formats information to be sent over interconnect network 24 to another processing element node or I/O gateway 28. Network interface 34 also receives incoming information from other processing element nodes or I/O gateway 28 and directs the information to processing element 30.

Interconnect network 24 comprises network routers such as network router 36 illustrated in FIG. 2. In addition, interconnect network 24 comprises physical communication links in each direction of each dimension. X dimension communication links 44 connect nodes in the x dimension. Y dimension communication links 46 connect nodes in the y dimension. Z dimension communication links 48 connect processing element nodes in the z dimension. Representative communication links in each dimension are illustrated in FIG. 1. In addition, FIG. 2 illustrates a communication link 44a in the −X direction, a communication link 44b in the +X direction, a communication link 46a in the −Y direction, a communication link 46b in the +Y direction, a communication link 48a in the −Z direction, and a communication link 48b in the +Z direction.

Communication links 44, 46, and 48 transfer data and control information between the network routers in the interconnect network. A communication link typically comprises two unidirectional channels. Each channel in the link preferably contains data, physical unit (phit) type, virtual channel select, and virtual channel acknowledge signals.

Data signals preferably carry either request information or response information. Request information contains information that requests a node to perform an activity. For example, a source node may send a request to a designation node to read data from memory in the destination node. This request is sent over one channel in the communication link. Responses contain information that is a result of an activity. For example, after receiving a request for read data, a destination node sends the response back to the source node. The response contains the read data. Requests and responses are preferably logically separated to avoid deadlock. The logical separation of requests and responses is described below.

Figure 4:
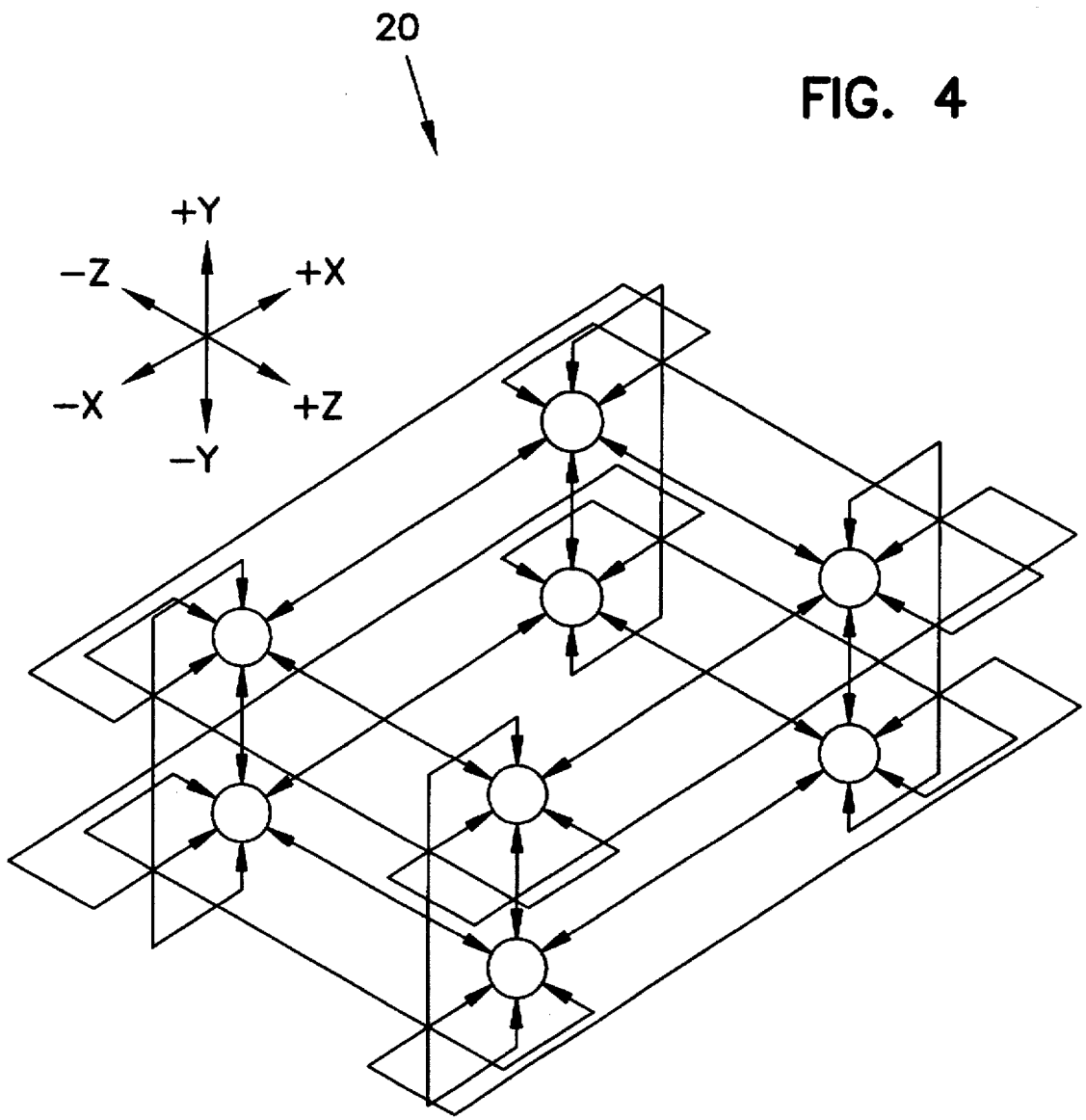
FIG. 4 is a diagram of a MPP system having a three-dimensional torus network topology.

Interconnect network 24 preferably connects the processing element nodes in a bi-directional torus. FIG. 4 illustrates a preferred embodiment of MPP system 20, having a three-dimensional toms network in the x, y, and z dimension. Each processing element node in the 3-D torus has communication links in both the + and − directions of the x, y, and z dimensions. Several of the other diagrams in the specification show three-dimensional network connections. For clarity, in these other diagrams, the communication links that complete the torus in each dimension are not shown.

In a torus topology, a ring is formed in each dimension where information can transfer from one node, through all of the nodes in the same dimension and back to the original node. Torus networks offer several advantages for network communication, such as increasing the speed of transferring information. Another advantage of the torus network is the ability to avoid bad communication links by sending information the long way around the network.

Information is transferred between the processing element nodes on the communication links in the form of a packet. Each packet preferably comprises a header. The header includes routing information that steers the packet through the network, destination information that indicates which processing element should receive the packet, and control information that instructs the processing element that receives the packet to perform an operation. The header may also contain source information that indicates which processing element created the packet and may contain memory address information. A packet optionally comprises a body. The body of a packet typically includes data to be transferred between processing element nodes or system data from or to the host system.

The network routers, such as network router 36, at each processing element node transfer packets through the communication links in interconnect network 24 based on the routing information contained in each header of each packet. The header and the body have variable links and transfer over the communication links one phit at a time. MPP system 20 uses wormhole routing as defined in the Background section in which routing information is contained in the header flit, and the remaining flits follow behind it in a train-like fashion. Flow control between nodes is accomplished on a flit-by-flit basis, rather than a packet-by-packet basis, so it is possible for a packet to be partially transmitted across a link and blocked due to a shortage of buffer space in a receiving processing element node. As mentioned above, the preferred embodiment of the present invention is a bi-directional 3-D torus network, which further complicates deadlock situations.

Adaptive Routing Mechanism

An adaptive routing mechanism according to the present invention for routing packets through interconnect network 24 utilizes virtual channels multiplexed across common physical communication links, but otherwise operating independently. As with the Duato deadlock-free subnetwork scheme described in the Background section, MPP system 20 utilizes an adaptive routing mechanism using a first subset of virtual channels C1. The C1 virtual channels implement non-adaptive, deadlock-free routing among all nodes. The second type of virtual channel is an NC1 virtual channel. The NC1 channels implement minimal fully adaptive routing. The NC1 virtual channels may have cycles in its channel dependency graph, since packets route freely in the NC1 channels. As in the Duato scheme, if at any time a decision would be made that would deadlock in the NC1 virtual channel, then the packet must be able to jump to the C1 virtual channel. Thus, packets in NC1 must always be able to route into a C1 channel.

Figure 5:
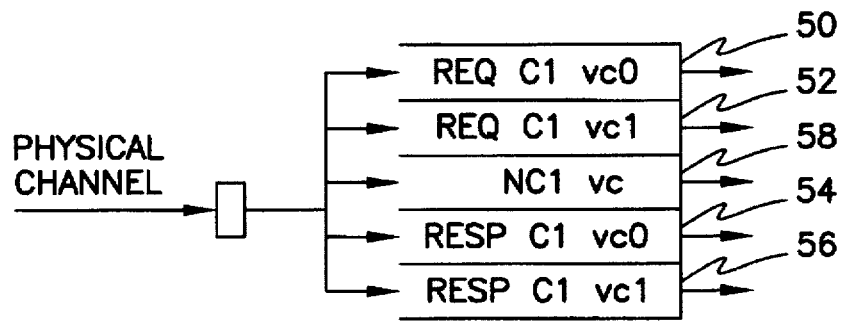
FIG. 5 is a diagram illustrating virtual channels utilized for each network physical communication link or channel of a preferred embodiment of MPP system of FIG. 1.

FIG. 5 illustrates the virtual channels utilized for each network physical channel or physical communication link. Two virtual channels 50 and 52 are used for the C1 virtual request network. Virtual channel 50 is a vc0 type virtual channel, and virtual channel 52 is a vc1 type virtual channel. Similarly, the response C1 virtual network comprises two virtual channels 54 and 56. Virtual channel 54 is a vc0 type virtual channel and virtual channel 56 is a vc1 type virtual channel. The third virtual channel, vc, is the adaptive NC1 virtual channel 58, which provides adaptive routing in both the request and response networks. Although the preferred embodiment illustrated in FIG. 5 uses one NC1 channel, a separate NC1 channel may be used for both the request and response virtual networks.

Figure 6:
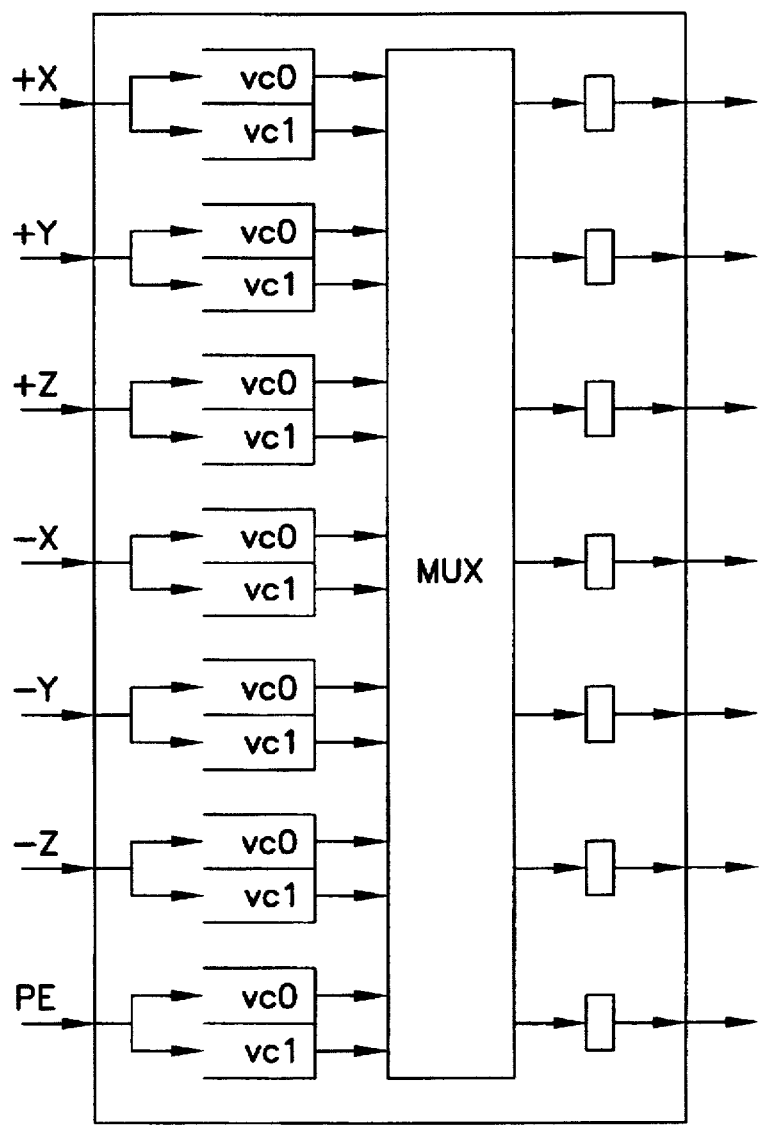
FIG. 6 is a block diagram of a switching mechanism in a 3-D network using virtual channels.

Referring to FIG. 6, each node has an input and output for each of the six directions (+X, −X, +Y, −Y, +Z, −Z) as well as the local processing element (PE). The block diagram of FIG. 6 illustrates switching in the 3D request or response C1 network using virtual channels. Buffers for the virtual channels reside at the processing node inputs at the receiving end of the physical communication link. The sending node on each physical communication link keeps track of the available buffer space for each virtual channel in the receiving processing element node, using flow control information sent on the opposite-direction link.

At any time, a packet in a C1 virtual channel may route to any NC1 virtual channel at the packets's current node that moves the packet closer to its destination (minimally). A packet in an NC1 virtual channel may also route minimally to any NC1 channel at its current node. A packet in an NC1 channel may route to a C1 channel at any time. Upon re-entering the C1 virtual channel network, the packet routes on a physical and virtual channel according to the deterministic C1 routing algorithm, using the current node's virtual channel look-up table. Within either the request or the response C1 virtual channel networks, choosing to begin a route of a packet on the vc0 virtual channel or the vc1 virtual channel and deciding when to change virtual channels during a route of a packet affects both correctness and performance. The primary consideration is correctness (i.e. the allocation of virtual channels between vc0 and vc1 must prevent deadlock).

The following three steps are performed to prevent deadlock in the C1 virtual channels. First, request and response packets are routed on separate sets of virtual channels. This breaks any cycles between request and response traffic. Secondly, direction-order routing is preferably used to break any cycles involving multiple directions. In other words, the packets are routed through a predetermined direction priority, such as (+X, +Y, +Z, −X, −Y, −Z). For example, using the direction order specified above, a route for a +X, −Y, +Z destination would route first +X, then +Z, then −Y. Direction order routing is described in detail in co-pending patent application Ser. No. 07/983,979, filed Nov. 30, 1992, and entitled "DIRECTION ORDER ROUTING IN MULTIPROCESSING SYSTEM" and assigned to Cray Research, Inc., the assignee of the present invention, which is incorporated herein by reference.

The third step to prevent deadlock is the use two virtual channels (vc0 and vc1) to break cycles within each ring. This third step can be achieved in a variety of ways to optimize performance. Preferred methods of virtual channel allocation are described in detail in the co-pending and commonly assigned U.S. patent application entitled "OPTIMIZED VIRTUAL CHANNEL ALLOCATION IN PARALLEL PROCESSING SYSTEMS," filed on even date herewith to Steven L. Scott and Gregory M. Thorson, the inventors of the present application, and which is incorporated herein by reference. The vc0 or vc1 virtual channel is selected when a packet begins muting on a ring via routing information stored in a virtual channel look-up table 37 (shown in FIG. 2) based upon the packet's destination on that ring (the coordinate of the destination node in the corresponding dimension). Each processing element node has a small, system-configurable virtual channel look-up table 37 for each of its six directions. Routing in the C1 network is strictly deterministic.

The routing mechanism between C1 and NC1 removes many of the restrictions from the Duato scheme described in the Background section. Unlike the Duato scheme, the muting function takes the virtual channel into account. In addition, the routing mechanism of the present invention permits flits multiple packets to reside in the same virtual channel buffer. Finally, the routing mechanism of the present invention allows cycles in an extended channel dependency graph of the C1 virtual network. Nevertheless, the following restriction is required for NC1 channels:

No packet may enter an NC1 channel unless the buffer for that channel has room to hold the entire packet.

The above restriction of the adaptive routing mechanism of the present invention achieves two results. First, the restriction prevents deadlock from occurring within the NC1 channels because no packet can block in an NC1 channel with its tail blocking the head of a different channel buffer. Since a packet whose head is at the front of an NC1 channel buffer can always route into a C1 virtual channel, deadlock of the NC1 virtual network is impossible. By contrast, Duato's scheme requires that no packets share the same channel buffer in order to achieve the same result. Duato's restriction prevents pipelining the transmission of packets across a link, became a second packet must wait until the packet ahead of the second packet is drained from its channel buffer before the second packet can begin transmission.

The second result of the above restriction of the present invention is that indirect dependencies between C1 channels no longer exist. Any packet that enters NC1 can be fully accepted by the first NC1 channel buffer because no packet may enter an NC1 virtual channel unless the buffer for that channel has room to hold the entire packet. Therefore, a packet cannot route from C1 into NC1 and back, and then block with the packet's tail consuming buffer space in the first C1 channel buffer. As a result, the extended channel dependency graph defined by the Duato reference is not relevant to the present invention's adaptive routing mechanism. Instead, the routing mechanism of the present invention can be used to route packets through any interconnect network topology for which a deadlock-free deterministic routing algorithm on the C1 channels can be constructed.

Preferably, as described above, the deadlock-free deterministic routing algorithm is the direction order routing scheme having two virtual channels assigned to the request network and two virtual channels assigned to the response network.

The routing mechanism used to select which virtual path to use between two nodes from the source node to the destination node is as follows:

A. If a head of an NC1 channel and a head of a C1 channel are both requesting the physical communication link, the C1 channel is granted access to the physical communication link.

B. A given packet has a pre-selected C1 virtual channel path between two nodes and one NC1 virtual channel path between two nodes and requests both the pre-selected C1 path and the one NC1 path.

C. The one NC1 path is selected as the highest order direction that is not blocked or disabled.

D. The portion of a granted virtual path is selected if at least one of the requests for the pre-selected C1 path and the one NC1 path is granted. If both the pre-selected C1 request and the one NC1 request are granted, the one NC1 path is selected.

E. If neither of the requests for the pre-selected C1 path and the one NC1 path are granted, the packet retries both requests on the next clock cycle.

In step C above, the highest order direction is selected so that the adaptive NC1 channel routes directions that would be routed later in the non-adaptive C1 channel. For example, for a direction order NC1 channel having a priority of +X, +Y, +Z, -X, -Y, -Z, the lowest order direction is +X and the highest order direction is -Z.

In step D above, if both the pre-selected C1 request and the one NC1 request are granted, the one adaptive NC1 virtual channel path is selected for two reasons. First, if a packet was granted the NC1 channel, then no other C1 channels were requesting the physical channel requested by the NC1 channel, because of step A. Therefore, it is less likely that some other packet is in the given packer's way. The second reason is that the highest order directions tend to be less congested. The highest order directions tend to be less congested because of the direction ordering in the C1 channels. Congestion results because of a string of dependencies from the highest order to the lowest order. As dictated by the direction order scheme, routes tend to enter the C1 channel in the lowest order directions and tend to leave the network on the C1 channel in the highest order directions.

Support for Arbitrary-Length Packets

The preferred MPP system 20 has a maximum packet length, such as slightly longer than a cache line, so that the restriction that an NC1 channel buffer have room for the entire packet before a packet can route on that channel is feasible. Nevertheless, another embodiment of the present invention supports adaptive routing with arbitrary-length packets by removing the restriction that an NC1 channel buffer have more for the entire packet before a packet can route on that channel. This embodiment of an adaptive routing mechanism according to the present invention is also useful if channel buffering is very limited, or in any other case where the requirement that a NC1 channel buffer hold an entire packet is not feasible.

In this alternative embodiment, the routing mechanism uses either of two methods to prevent deadlock among the NC1 channels. This first method is to use the Duato scheme restriction that no packets can simultaneously reside in an NC1 channel buffer. The second method is to use hardware to keep track of the head of the last packet to enter each NC1 buffer, and enable that packet to drain from the NC1 buffer to a C1 channel, bypassing the packet in front of it. Either of these solutions allow cyclic dependencies among NC1 channels to be broken by routing packets from an NC1 channel buffer into a C1 channel.

In this embodiment, NC1 buffers are no longer guaranteed to hold an entire packet. Thus, indirect dependencies can arise between two C1 channels via some number of intermediate NC1 channels. This embodiment of the adaptive routing mechanism according to the present invention prevents these indirect dependencies from causing deadlock in the C1 virtual network in a 3-D torus topology by maintaining extra state information in the packets routing in the NC1 channel and by restricting the choice of which virtual channel to use when reentering the C1 channel from the NC1 channel.

Since the C1 virtual network preferably uses direction-order routing, the only way for indirect dependencies to cause deadlock is for a packet to leave C1 traveling in direction i, route in NC1, and then reenter NC1 and continue routing in direction i. This problem is solved by assuring that a packet that reenters C1 traveling in the same direction as it was traveling before it left C1 continues on the same virtual channel and by aligning datelines of all rings in a given direction.

When a packet traveling in direction d on C1 virtual channel c enters the NC1 network, the virtual channel c is saved in the packet header. A bit in the header (called the continuation bit) is set if the packet has additional routing to do in direction d. As the packet routes in the NC1 channel, the continuation bit is cleared if direction d is satisfied. Given the preferred direction order routing algorithm used in the C1 channel, direction d is always the lowest-order unsatisfied direction, so direction d does not have to be explicitly saved in the packet. If and when the packet reenters the C1 channel, if the continuation bit is set, then the packet is continuing to route in direction d, and the saved C1 virtual channel c is used. Otherwise, the packet is starting in a new, higher-order direction, and the virtual channel is selected via table look-up.

This alternative embodiment routing mechanism guarantees that only a single C1 virtual channel is used for all hops by a packet in a given direction. Since the datelines in virtual channel tables are identical for all rings of a given direction, no cyclic dependencies can arise among the C1 virtual channels.

Support for Ordered Routing

The order that packets are delivered to a destination node in an interconnect network having an adaptive routing mechanism is not guaranteed. Since packets may traverse any of the alternate paths between nodes in adaptive routing, a second packet may possibly arrive at a destination node ahead of a packet that was transmitted from the same source node before the second packet.

A response packet can always be routed adaptively, as the order of response packet delivery does not affect program correctness. In addition, MPP system 20 preferably supports a relaxed memory consistency model to allow most requests to be delivered in arbitrary order. In some cases, however, this is not acceptable. For example, two writes by the same process to the same remote memory location must be delivered in order if program correctness is to be preserved.

The ability to transmit ordered requests on a packet-by-packet basis is supported by MPP system 20. A special ordered bit is set in an ordered request packet to prevent adaptive routing of the packet. In this way, ordered request packets always traverse the same set of virtual channels between any two given nodes. Thus, ordered request packets cannot pass each other in the interconnect network.

Even if the special ordered bit is set in all request packets indicating that all requests are ordered, adaptive routing can take place with response packets. Moreover, as a general rule, memory request workloads include more read than write requests, so response traffic tends to be heavier than the request traffic in most cases.

Routing of Packets

MPP system 20 preferably uses absolute addressing in all three dimensions, from source to destination node. Alternatively, MPP system 20 uses differential addressing wherein the destination address is calculated at the source node and is decremented/incremented to 0 when it reaches the destination node.

As described above, the C1 virtual channel preferably uses direction order routing having a predetermined direction order priority such as (+X, +Y, +Z, −X, −Y, −Z). The preferred embodiment of MPP system 20 permits an exception to this predetermined direction order priority by allowing the initial hop of route to be a free hop in any one of the first three directions of the six directions of the ordering, as long as the free hop is not to a dateline. After the particular initial free hop, the packet is allowed to route normally in remaining directions of the six directions as dictated by the direction ordering on the C1 virtual channel or the adaptive ordering of the NC1 virtual channel as prescribed by the adaptive routing mechanism of the present invention. This "initial" hop is free in the sense that the source of a given packet does not need to include any extra routing information in the packet to accomplish the initial hop. The source node router simply throws the packet in the direction of the initial hop, and the routing starts over at the destination of that hop.

In addition to the initial free hop, the preferred embodiment of the routing mechanism is capable of implementing a final hop in the lowest priority direction if a final hop bit is set in the routing information. This final hop permits better access to partial planes. The final hop is not free because one bit (the final hop bit) is needed to indicate whether or not one hop in the final direction is to be taken.

Figure 7:
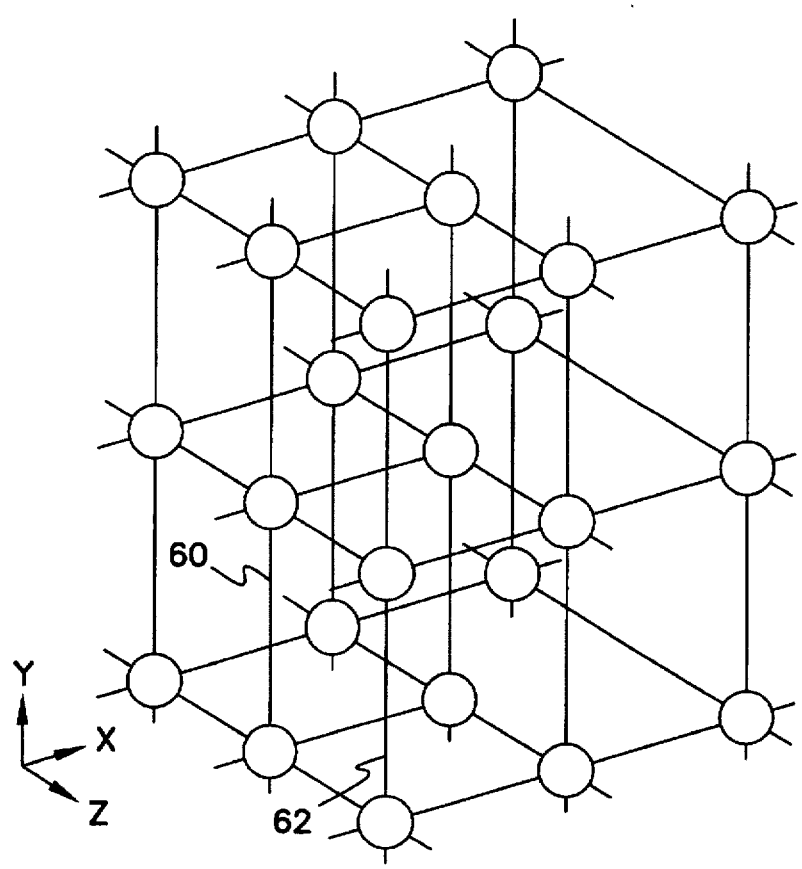
FIG. 7 is a subsection of a MPP system network illustrating a partial Z plane.

Referring to FIG. 7, MPP system 20 preferably is configurable to allow for partial planes, such as partial Z planes. Partial Z planes are planes perpendicular to the Z dimension. Given the direction order priority of (+X, +Y, +Z, −X, −Y, −Z), packet traffic originating on a partial Z plane can take an initial hop in +Z to a plane neighboring the partial Z plane. The packet traffic routes from the neighboring plane with routing tags that are identical to the corresponding routing tags of packet traffic originating from the neighboring plane. Packet traffic to be routed to a destination node on a partial Z plane, is routed to a plane neighboring the partial Z plane in the +Z direction. From the +Z neighboring plane, a final hop in the −Z direction is taken to reach the partial Z plane. The initial and final hops are taken only if a normal route does not exist from or to a partial Z plane. For example, in FIG. 7, a packet routing from partial Z plane 60 can make an initial hop to complete Z plane 62. If the destination node is on partial Z plane 60, the packet can route to complete Z plane 62, and then take a final hop in the −Z direction to reach partial Z plane 60.

There are two primary reasons for having partial Z planes in very large systems such as MPP system 20. First, MPP system 20 preferably includes redundant nodes so that MPP system 20 can be reconfigured to replace broken nodes with the redundant nodes. Secondly, partial Z planes allow the system to be upgraded one module at a time. For example, in one embodiment of MPP system 20, one module comprises eight processing element nodes in a liquid cooled system and comprises four processing element nodes in an air cooled system.

Figure 8:
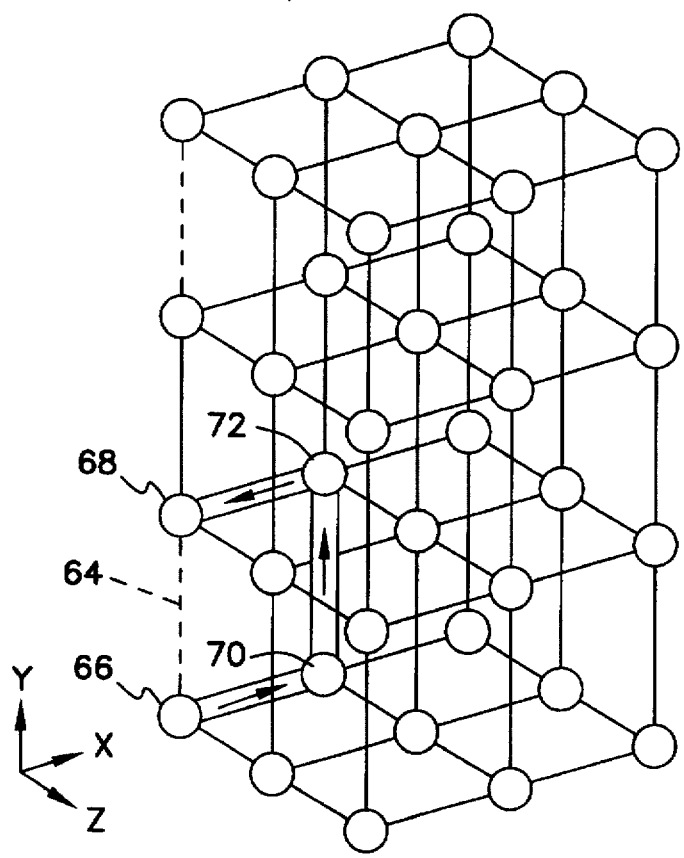
FIG. 8 is a subsection of a MPP system network illustrating the use of both +X and −X physical communication links to avoid broken physical communication links.

Referring to FIG. 8, the routing mechanism according to the present invention uses the initial and final hops to provide shorter alternate routes. Moreover, the initial and final hops permit the interconnect network to configure around many multiple failures that would otherwise be uncorrectable. For example, a packet can be given an initial direction of +X while the packet's routing bits indicate a −X, +Y, +Z path. Given the direction order priority of (+X, +Y, +Z, −X, −Y, −Z), in this example a packet makes a single "initial hop" in the +X direction followed by routes in the +Y direction, then the +Z direction, and finally the −X direction. In FIG. 8, the +Y physical communication link 64 between processing element node 66 and processing element node 68 is broken. As is illustrated in FIG. 8, a packet takes an initial free hop from node 66 to node 70 in the +X direction. From node 70, the packet then routes in the +Y direction to node 72 and then in the −X direction to destination node 68 to thereby avoid the faulty communication link 64.

The initial free hop cannot be made to a dateline node, otherwise a dependency from vc0 to vc0 could be extended across the dateline. Another restriction to initial hops is that datelines must be aligned for a given direction, otherwise a dependency from vc0 to vc0 could be extended across the dateline.

Virtual Channel Assignments

As previously mentioned, the allocation between vc0 and vc1 on either the request or the response virtual channel networks impacts performance as well as correctness. The balancing of the usage of the virtual channels sharing a physical communication link reduces contention in the network and lowers communication latency and increases network bandwidth. The allocation of the virtual channels must be made to break cycles within each ring to assure that deadlock is avoided in the C1 network.

Figure 9:
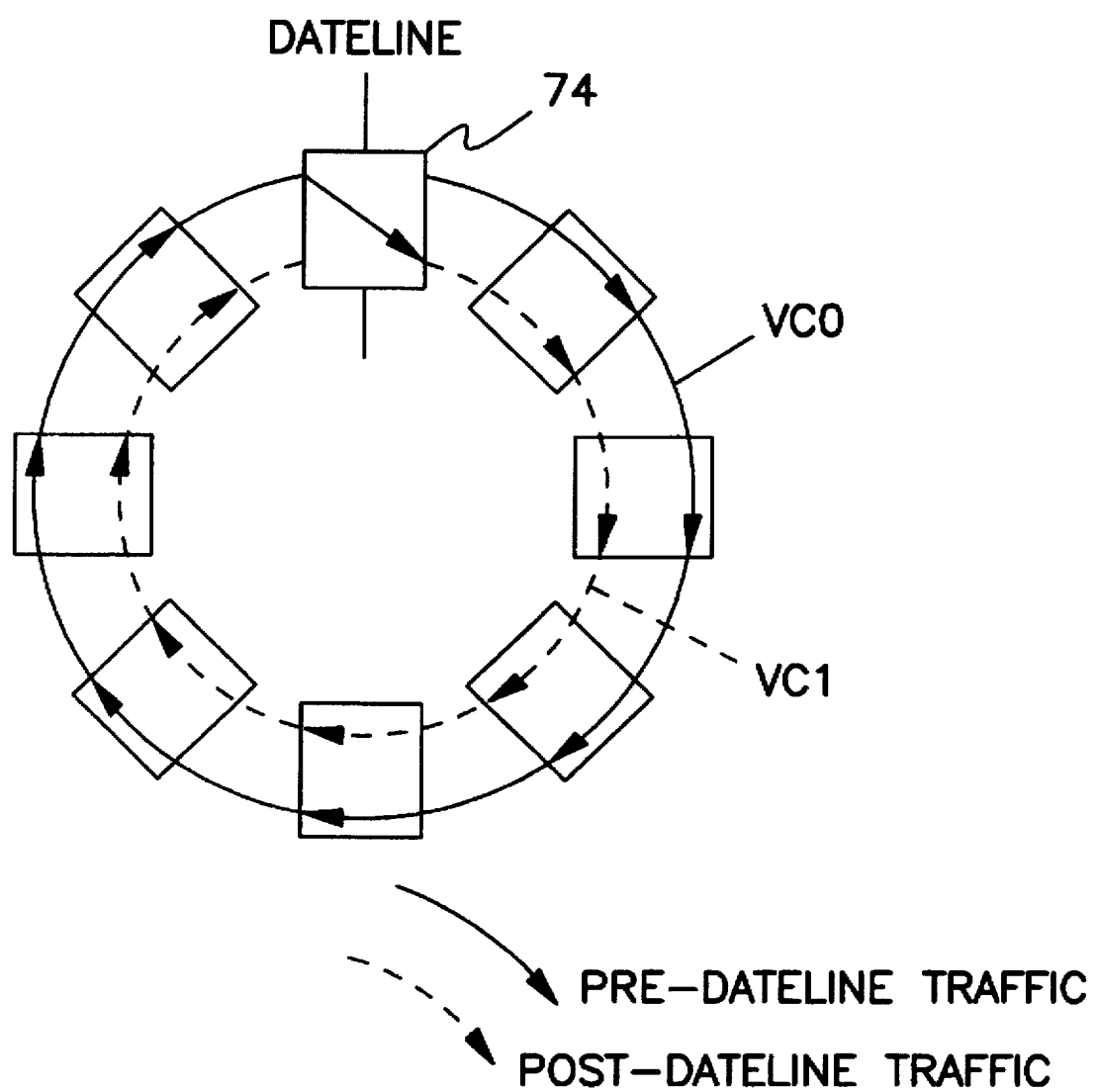
FIG. 9 is a diagram illustrating a time-of-crossing virtual channel assignment for physical cycles.

One method of allocating between virtual channels vc0 and vc1, is the time-of-crossing scheme. Referring to FIG. 9, the time-of-crossing scheme starts all packets on virtual channel vc0. One node on the ring (dateline node 74) transfers any packets that pass through dateline node 74 on the ring onto virtual channel vc1. Since packets never enter and leave dateline node 74 on virtual channel vc0, no cycles are created among the vc0 buffers. Since packets never travel all the way around the ring, no packet ever enters dateline node 74 on virtual channel vc1, and thus no cycles are created among the vc1 buffers. Furthermore, since no packets ever routes from virtual channel vc1 to virtual channel vc0, no cycles are created involving both vc0 and vc1 buffers. Since no packet should ever enter the dateline node from virtual channel vc1, any packet that attempts to cross the dateline on virtual channel vc1 is swallowed by the hardware and an error is flagged.

Another method of allocating between virtual channels vc0 and vo1 is the predicted-crossing scheme. The predicted-crossing scheme does not use a physical dateline node that switches packets between virtual channels.

Instead, the predicted-crossing scheme uses a logical dateline node or link to avoid deadlock. In an interconnect network using the predicted-crossing scheme, packets are pre-scheduled such that any packet that will cross the logical dateline node or link given the packer's source node and destination node on the ring uses virtual channel vc0, else the packet uses virtual channel vc1. Packets never switch virtual channels on a given ring. The pre-scheduling based on the logical dateline breaks any cycles among the vc1 buffers. In order for there to be no cycles among the vc0 buffers, packets must never route more than halfway around the ring in the predicted-crossing scheme.

Thus, in the time-of-crossing scheme, the dateline node causes messages traveling on one virtual channel to dynamically switch to another virtual channel. By contrast, in the predicted-crossing scheme the messages must be pre-scheduled on virtual channels so that messages will not cross the logical datelines.

Both the time-of-crossing and the predicted-crossing schemes can be improved by carefully selecting the virtual channels on which packets are routed in order to better balance the virtual channel usage. In another virtual channel allocation scheme referred to as the balanced time-of-crossing scheme, some source nodes on a given ring start their packets on virtual channel vc1 rather than virtual channel vc0 to balance virtual channel usage. These packets remain on virtual channel vc1 if they cross the dateline. Thus, in the balanced time-of-crossing scheme care must be taken in selecting the source nodes that start their packets on virtual channel vc1 so that deadlock is not introduced among the vc1 virtual channels of a ring by this optimization.

The balanced predicted-crossing scheme is a superset of the predicted-crossing scheme that takes advantage of the flexibility introduced by packets that cross neither the dateline nor the reciprocal dateline. In this "don't-care" situation, the virtual channel is chosen in order to maximize the balance between vc0 and vc1 traffic.

The balanced predicted-crossing scheme is able to achieve a better balance than the balanced time-of-crossing scheme. However, the balanced time-of-crossing scheme does not pre-schedule messages. As a result, in the balanced time-of-crossing scheme, the virtual channel assignment information is not carried with the packets, but is instead stored in the interconnect network itself. By contrast, the pre-scheduling required with the balanced predicted-crossing scheme is typically carried with the packet. With the balanced time-of-crossing scheme, the virtual channel allocation is not reloaded with broken node information, because the dateline node physically switches the message between virtual channels vc0 and vc1. Thus, in the balanced time-of-crossing scheme, the virtual channel assignments are typically based on an optimized healthy machine. On the other hand, the pre-scheduling required with the logical dateline node or link typically needs to be reloaded and carried with the packet to take account of broken node information.

With either the balanced time-of-crossing scheme or the balanced predicted-crossing scheme there are various methods to optimize all unrestrained routes. The unrestrained routes are routes of packets that do not cross the dateline in a balanced time-of-crossing scheme and routes of packets that cross neither the dateline nor the reciprocal dateline in the balanced predicted-crossing scheme. Preferred methods of optimizing all unrestrained routes are described in detail in the above cited and incorporated co-pending and commonly assigned U.S. patent application entitled "OPTIMIZED VIRTUAL CHANNEL ALLOCATION IN PARALLEL PROCESSING SYSTEMS," filed on even date herewith to Steven L. Scott and Gregory M. Thorson.

Conclusion

The routing mechanism according to the present invention provides fully adaptive, deadlock-free routing on a torus of any dimension. The routing mechanism of the present invention requires only five virtual channels: two C1 channels for request, two C1 channels for responses, and one NC1 channel. Either physical or logical datelines can be used to avoid deadlock in the C1 channels. The routing mechanism can be easily modified to provide ordered delivery on a packet-by-packet basis when necessary. Finally, the routing mechanism of the present invention can provide the same functionality as above by using a modified mechanism if arbitrary-length packets must be supported.

What is claimed is:

1. A method of routing a packet between a source node and a destination node in a networked system comprising a plurality of nodes and physical communication links interconnecting the nodes in an n-dimensional topology, the method comprising:

generating a header including routing information;

attaching the header to information to be transferred in order to form a packet;

defining two acyclic non-adaptive virtual channels utilizing associated virtual channel buffers assigned to the physical communication links to store the packet along a deterministic virtual path from the source node to the destination node based on the routing information;

defining an adaptive virtual channel utilizing associated virtual channel buffers assigned to the physical communication links to store the packet along a plurality of non-deterministic virtual paths from the source node to the destination node based on the routing information;

selecting either a portion of the deterministic virtual path from the source node to an adjacent node along the deterministic virtual path or a portion of one of the non-deterministic virtual paths from the source node to an adjacent node along the one non-deterministic virtual path based on the routing information, wherein the portion of the one non-deterministic virtual path is not selected unless the virtual channel buffer associated with the portion of the one non-deterministic virtual path has sufficient space available to store the entire packet;

routing the packet from the source node to the adjacent node along the portion of the selected virtual path; and continuing to select virtual paths at each node from the source to the destination node and to route the packet on the selected virtual paths until the packet reaches the destination node.

2. The method of claim 1 further comprising the step of defining a direction order for routing packets, wherein the direction order defines a priority for routing the packets in each of 2n directions along the deterministic virtual path.

3. The method of claim 2 wherein the one non-deterministic virtual path is pre-selected for routing in the lowest priority direction of the 2n directions that is not blocked or disabled.

4. The method of claim 1 wherein the step of selecting a path for routing comprises the steps of:

pre-selecting the one non-deterministic virtual path;

requesting both the portion of the pre-selected non-deterministic virtual path and the portion of the deterministic virtual path for routing of the packet;

granting or denying access to the physical communication links in response to said requests and other competing requests for the physical communication links, wherein if an adaptive virtual channel and a non-adaptive virtual channel are both requesting access of a physical communication link the non-adaptive virtual channel is granted access to the physical communication link;

selecting the portion of a granted virtual path if at least one of said requests is granted, wherein the portion of the one non-deterministic virtual path is selected if both of said requests are granted; and retrying the requesting step if neither of said requests are granted.

5. The method of claim 1 wherein the method routes multiple packets between the plurality of nodes, and wherein the method further comprising the steps of:

determining order dependent groups of packets which are required to arrive at the destination node in a predetermined order; and selecting only the deterministic virtual paths for routing packets which are in an order dependent group of packets.

6. The method of claim 1 wherein the information to be transferred includes request and response information, and wherein the step of defining acyclic non-adaptive virtual channels includes defining two acyclic non-adaptive virtual channels for handling the request information and two acyclic non-adaptive virtual channels for handling the response information.

7. The method of claim 1 further comprising sending the packet in a free hop from the source node to an adjacent node prior to the selecting step.

8. The method of claim 7 wherein the n-dimensional topology comprises physical communication lines connecting nodes in 2n directions including first and second directions in each dimension, and wherein the step of sending the packet in a free hop from the source node to an adjacent node comprises sending the packet in any one of the first directions.

9. The method of claim 1 wherein the step of transferring the packet further comprises sending the packet on a final hop from a node adjacent to the destination node to complete the route to the destination node.

10. The method of claim 9 wherein the final hop is taken based on the routing information.

11. The method of claim 9 wherein the final hop is limited to a single direction in one of the n dimensions.

12. A method of routing a packet between a source node and a destination node in a networked system comprising a plurality of nodes and physical communication links interconnecting the nodes in an n-dimensional topology, the method comprising:

generating a header including routing information;

attaching the header to information to be transferred in order to form a packet;

defining two acyclic non-adaptive virtual channels utilizing associated virtual channel buffers assigned to the physical communication links to store the packet along a deterministic virtual path from the source node to the destination node based on the routing information;

defining an adaptive virtual channel utilizing the third type of virtual channel buffers to store the packet along a plurality of non-deterministic virtual paths from the source node to the destination node based on the routing information;

selecting either a portion of the deterministic virtual path from the source node to an adjacent node along the deterministic virtual path or a portion of one of the non-deterministic virtual paths from the source node to an adjacent node along the one non-deterministic virtual path based on the routing information, wherein the portion of the one non-deterministic virtual path is not selected unless the virtual channel buffer associated with the portion of the one non-deterministic virtual path is empty;

routing the packet from the source node to the adjacent node along the portion of the selected virtual path;

if a packet is routed to the portion of the one non-deterministic virtual path, recording a direction and a deterministic virtual path the packet is on as the packet enters the portion of the one non-deterministic virtual path, and when the packet reenters the deterministic virtual path continue routing the packet in the recorded direction on the recorded deterministic virtual path if all transfers in the recorded direction are not completed; and continuing to select virtual paths at each node from the source to the destination node and to route the packet on the selected virtual paths until the packet reaches the destination node.

13. The method of claim 12 further comprising the step of defining a direction order for routing packets, wherein the direction order defines a priority for routing the packets in each of 2n directions along the deterministic virtual path.

14. The method of claim 12 wherein the one non-deterministic virtual path is pre-selected for routing in the lowest priority direction of the 2n directions that is not blocked or disabled.

15. The method of claim 12 wherein the step of selecting a path for routing comprises the steps of:

pre-selecting the one non-deterministic virtual path;

requesting both the portion of the pre-selected non-deterministic virtual path and the portion of the deterministic virtual path for routing of the packet;

granting or denying access to the physical communication links in response to said requests and other competing requests for the physical communication links, wherein if an adaptive virtual channel and a non-adaptive virtual channel are both requesting access of a physical communication link the non-adaptive virtual channel is granted access to the physical communication link;

selecting the portion of a granted virtual path if at least one of said requests is granted, wherein the portion of the one non-deterministic virtual path is selected if both of said requests are granted; and retrying the requesting step if neither of said requests are granted.

16. The method of claim 12 wherein the method routes multiple packets between the plurality of nodes, and wherein the method further comprising the steps of:

determining order dependent groups of packets which are required to arrive at the destination node in a predetermined order; and selecting only the deterministic virtual paths for routing packets which are in an order dependent group of packets.

17. The method of claim 12 wherein the information to be transferred includes request and response information, and wherein the step of defining acyclic non-adaptive virtual channels includes defining two acyclic non-adaptive virtual channels for handling the request information and two acyclic non-adaptive virtual channels for handling the response information.

18. The method of claim 12 further comprising sending the packet in a free hop from the source node to an adjacent node prior to the selecting step.

19. The method of claim 12 wherein the step of transferring the packet further comprises sending the packet on a final hop from a node adjacent to the destination node to complete the route to the destination node.

20. A multiprocessor computer system comprising:

a plurality of processing element nodes;

physical communication links interconnecting the processing element nodes in an n-dimensional topology;

means for generating headers having routing information;

means for attaching the headers to information to be transferred between the processing element nodes in order to form packets;

two acyclic non-adaptive virtual channels having virtual channel buffers assigned to each physical communication link to store the packets along deterministic virtual paths between the plurality of processing element nodes based on the routing information;

an adaptive virtual channel having virtual channel buffers assigned to each physical communication link to store the packets along non-deterministic virtual paths between the plurality of processing element nodes based on the routing information;

means for selecting either a portion of a deterministic virtual path between two processing element nodes along said deterministic virtual path or a portion of a non-deterministic virtual path between two processing element nodes along said non-deterministic virtual path based on the routing information, wherein the portion of said non-deterministic virtual path is not selected unless the virtual channel buffer associated with the portion of said non-deterministic virtual path has sufficient space available to store an entire packet; and means for routing the packets between the processing element nodes along the selected portions of said virtual paths.

21. A multiprocessor computer system comprising:

a plurality of processing element nodes;

physical communication links interconnecting the processing element nodes in an n-dimensional topology;

means for generating headers having routing information;

means for attaching the headers to information to be transferred between the processing element nodes in order to form packets;

two acyclic non-adaptive virtual channels having virtual channel buffers assigned to each physical communication link to store the packets along deterministic virtual paths between the plurality of processing element nodes based on the routing information;

an adaptive virtual channel having virtual channel buffers assigned to each physical communication link to store the packets along non-deterministic virtual paths between the plurality of processing element nodes based on the routing information;

means for selecting either a portion of a deterministic virtual path between two processing element nodes along said deterministic virtual path or a portion of a non-deterministic virtual path between two processing element nodes along said non-deterministic virtual path based on the routing information, wherein the portion of said non-deterministic virtual path is not selected unless the virtual channel buffer associated with the portion of said non-deterministic virtual path is empty;

means for routing the packets between the processing element nodes along the selected portions of said virtual paths including means for recording a direction and a deterministic virtual path which a packet is on when the packet enters the portion of said non-deterministic virtual path, and means for routing the packet in the recorded direction on the recorded deterministic virtual path if all transfers in the recorded direction are not completed when the packet reenters the deterministic virtual path from the portion of said non-deterministic virtual path.

22. A routing mechanism for routing packets coming information to be transferred between nodes in an n-dimensional networked system, the routing mechanism comprising:

two acyclic non-adaptive virtual channels having virtual channel buffers to store the packets along deterministic virtual paths between the nodes;

an adaptive virtual channel having virtual channel buffers to store the packets along non-deterministic virtual paths between the nodes;

means for routing the packets between the nodes along either selected portions of the deterministic virtual paths or selected portions of the non-deterministic virtual paths, wherein a packet is never routed on a selected portion of one of the non-deterministic virtual paths unless the virtual channel buffer associated with the selected portion of the one non-deterministic virtual path has sufficient space available to store the entire packet.

* * * * *